(12) United States Patent
Flin et al.

(10) Patent No.: US 10,968,100 B2
(45) Date of Patent: Apr. 6, 2021

(54) METHOD FOR PRODUCING SYNTHESIS GAS BY MEANS OF STEAM REFORMING REACTORS

(71) Applicant: L'Air Liquide, Société Anonyme pour l'Etude et l'Exploitation des Procédés Georges Claude, Paris (FR)

(72) Inventors: Matthieu Flin, Vanves (FR); Solène Valentin, Meudon (FR); François Fuentes, Le Vesinet (FR); Marc Wagner, Saint Maur des Fosses (FR); Quentin Saniez, Paris (FR)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 375 days.

(21) Appl. No.: 15/932,191

(22) PCT Filed: Aug. 17, 2016

(86) PCT No.: PCT/FR2016/052086
§ 371 (c)(1),
(2) Date: Feb. 16, 2018

(87) PCT Pub. No.: WO2017/029452
PCT Pub. Date: Feb. 23, 2017

(65) Prior Publication Data
US 2020/0140272 A1    May 7, 2020

(30) Foreign Application Priority Data

Aug. 18, 2015  (FR) ...................... 1557785

(51) Int. Cl.
*C01B 3/38*    (2006.01)
*B01D 53/047*  (2006.01)
*C01B 3/56*    (2006.01)

(52) U.S. Cl.
CPC ............ *C01B 3/382* (2013.01); *B01D 53/047* (2013.01); *C01B 3/384* (2013.01); *C01B 3/56* (2013.01);
(Continued)

(58) Field of Classification Search
CPC  C01B 3/382; C01B 3/384; C01B 3/56; C01B 2203/0233; C01B 2203/141; C01B 2203/0811; B01D 53/047
See application file for complete search history.

(56) References Cited

U.S. PATENT DOCUMENTS

| | | | |
|---|---|---|---|
| 5,925,328 A | 7/1999 | Stahl et al. | |
| 2006/0147370 A1* | 7/2006 | Mathias | B01J 19/0093 423/650 |

(Continued)

FOREIGN PATENT DOCUMENTS

| | | |
|---|---|---|
| EP | 1 767 492 | 3/2007 |
| WO | WO 2006 027175 | 3/2006 |
| WO | WO 2010 122031 | 10/2010 |

OTHER PUBLICATIONS

International Search Report and Written Opinion for corresponding PCT/FR2016/052086, dated Oct. 5, 2016.

*Primary Examiner* — Anthony J Zimmer
*Assistant Examiner* — Syed T Iqbal
(74) *Attorney, Agent, or Firm* — Elwood L. Haynes

(57) ABSTRACT

A process for producing synthesis gas using at least a first and a second steam reforming reactor each having at least one reaction stage enabling the circulation of a reaction mixture and at least one heat supply stage enabling the circulation of a heat transfer fluid.

16 Claims, 3 Drawing Sheets

(52) U.S. Cl.
CPC ............... *C01B 2203/0233* (2013.01); *C01B 2203/0811* (2013.01); *C01B 2203/141* (2013.01)

(56) References Cited

U.S. PATENT DOCUMENTS

2007/0092436 A1* 4/2007 Rojey .................... C01B 3/384
                                                    423/651
2012/0256132 A1* 10/2012 Polster .................. C01B 3/384
                                                    252/373

* cited by examiner

METHOD FOR PRODUCING SYNTHESIS GAS BY MEANS OF STEAM REFORMING REACTORS

CROSS REFERENCE TO RELATED APPLICATIONS

This application is a 371 of International Patent Application PCT/FR2016/052086 filed Aug. 17, 2016, which claims priority to French Patent Application 1557785, filed Aug. 18, 2015, the entire contents of which are incorporated herein by reference.

BACKGROUND

The present invention relates to a process for producing synthesis gas by means of steam reforming reactors, preferably milli-structured exchangers-reactors.

Currently, the most common process for producing synthesis gas is methane steam reforming. This reaction is catalytic and endothermic. The heat needed for the reaction is obtained by combustion in a radiative furnace. The synthesis gas is therefore obtained at high temperature (around 900° C.). One already widespread optimization proposes carrying out the reaction in a milli-structured exchanger-reactor in order to improve the transfers of heat and of material within the reactor.

The reforming reactor described in this invention is an assembly of plates or stages formed of millimetric channels. An individual module of this reactor is composed of two plates or stages where a hot gas circulates in order to supply the heat needed for the reaction (heat supply stages). Placed between these two plates/stages are two reaction plates/stages that are covered with catalysts and are where the reaction takes place. Placed between these two reaction plates/stages is a "products" plate/stage, where the synthesis gas produced circulates while supplying heat to the reaction. The presence of a "products" plate/stage represents a specific design of the equipment in order to increase the heat recovery over the whole of the process. This design may be different depending on the requirements of the process, the principle being to abide by an alternation of heat supply plates or stages and reaction plates or stages (FIG. 1).

If the design of the reactor comprises "products" plates/stages, the passage from the two reaction plates/stages to the "products" plates/stages takes place via openings located at the end of the reaction plates/stages and of the "products" plates/stages making it possible to collect in a channel of the "products" plates/stages, the flow from a channel of the reaction plate/stage located above the "products" plate/stage and the flow from a channel of the reaction plate/stage located below the "products" plate/stage.

In the remainder of the description, for the sake of simplification, "stages" will be referred to for any type of exchanger-reactor, that is to say for exchangers-reactors having plates and assembly interfaces between the plates and for exchangers-reactors that are monolithic parts, that is to say parts that have no assembly interfaces between the stages. Such a monolithic part may be obtained by an additive method.

The hot gas that supplies the heat needed for the reaction is produced by combustion.

SUMMARY

The present invention proposes to provide an improved process for producing synthesis gas.

One solution of the present invention is a process for producing synthesis gas using at least a first and a second steam reforming reactor each comprising at least one "reaction" stage enabling the circulation of a reaction mixture and at least one "heat supply" stage enabling the circulation of a heat transfer fluid, comprising the following steps:

a) mixing a hydrocarbon feedstock gas and steam so as to form the reaction mixture, b) simultaneously supplying the reaction stages of the first and second steam reforming reactors with the reaction mixture obtained in step a), c) producing combustion flue gases that can be used as heat transfer fluid within the steam reforming reactors, d) cooling the combustion flue gases to a temperature below or equal to 1000° C., e) introducing the combustion flue gases from step d) into the "heat supply" stage of the first steam reforming reactor, f) recovering the combustion flue gases at the outlet of the first steam reforming reactor and introducing them into the "heat supply" stage of the second steam reforming reactor, and g) recovering synthesis gas at the outlet of the first and second steam reforming reactors.

Note that the first and second steam reforming reactors may each be replaced by a set of reactors, each set possibly comprising several steam reforming reactors in parallel.

In the case, the process according to the invention may have one or more of the following features:
- in step d) the combustion flue gases are cooled to a temperature below 900° C.;
- in step d) the combustion flue gases are cooled by dilution with flue gases that are colder than the combustion flue gases recovered downstream of the at least first steam reforming reactor and/or with dilution air;
- the flue gases that are colder than the combustion flue gases have undergone a cooling by steam generation;
- in step d) the cooling of the combustion flue gases takes place by 0 to 80% dilution with flue gases colder than the combustion flue gases recovered downstream of the at least first steam reforming reactor and 0 to 80% dilution with dilution air;
- in step c) the combustion flue gases are produced by means of at least one burner;
- in step c) the combustion flue gases are produced by means of a first and a second burner, the first burner generating the combustion flue gases for the first steam reforming reactor and the second burner generating the combustion flue gases for the second steam reforming reactor. Note that "burner" is understood to mean a burner or a combustion chamber comprising several burners depending on the size of the facility envisaged;
- the combustion flue gases from steps c), d) and e) correspond to those generated by the first burner and in step f) the combustion flue gases are recovered at the outlet of the first steam reforming reactor before sending them to the second burner generating the combustion flue gases for the second steam reforming reactor;
- the combustion flue gases from steps c), d) and e) correspond to those generated by the first burner and in step f) the combustion flue gases are recovered at the outlet of the first steam reforming reactor before mixing them with the combustion flue gases generated by the second burner; said mixture then being introduced into the "heat supply" stage of the second steam reforming reactor;

the synthesis gas recovered in step g) comprises hydrogen and carbon monoxide and said process uses a hydrogen purification unit;

the purification unit is a PSA pressure swing adsorption unit;

the residual flow leaving the PSA is recycled for the production of the combustion flue gases;

the steam reforming reactors are milli-structured reactors, the steam reforming reactors have no assembly interfaces between the various stages. These steam reforming reactors are preferably manufactured by an additive manufacturing method.

The invention proposes novel solutions for reducing the inlet temperature of the flue gases in the exchangers-reactors while supplying the heat needed for the endothermic steam reforming reaction and for the whole of the process (steam generation needed for the steam reforming, preheating of the feedstock, of the fuel, of the water, etc. . . . ). These solutions are based on a configuration having at least two steam reforming reactors supplied in parallel with respect to the hydrocarbon feedstock, steam mixture and in series with respect to the flue gases that are used to supply a portion of the heat needed for the steam reforming reaction. In order to reduce the inlet temperature of the flue gases in the exchangers-reactors, flue gases colder than the combustion flue gases from downstream in the process are used. These "colder" flue gases are obtained after passing through heat exchangers dedicated to the recovery of heat in other parts of the steam reforming process (mention may in particular be made of the exchangers for preheating the hydrocarbon feedstock and steam mixture, the exchangers for preheating the demineralized water, the boilers for steam generation, etc.). The "colder" flue gases are recycled downstream of the burner(s) in a judicious proportion for diluting the hot flue gases from the combustion of a mixture of purge gas from the purification unit, of fuel and of combustion air. Thus, it is proposed, in order to reach a target temperature (below 1000° C.) at the inlet of the exchangers-reactors, to work with a mixture of dilution air and recycled cold flue gases. It is also possible to work only with dilution air and without recycled flue gases. This dilution air is introduced downstream of the burner(s) and is no longer used as combustion air, but indeed as diluent for reducing the temperature of the flue gases. Conversely, depending on the oxygen content of these flue gases, they may also be used as oxidant and optionally may completely replace the combustion air in the configurations with two burners.

Finally, the most judicious configuration will consist in using a combination of dilution air and "colder" flue gas recycle while retaining the serialization of the sets of exchangers-reactors with respect to the flue gases. It is then possible to work at a lower flue gas temperature over the exchangers-reactors and in particular below 1000° C. while minimizing the fuel consumption and the energy consumption.

Firstly, the advantage of having flue gases at lower temperature at the inlet of the reforming reactors is to be able to use a larger number of materials for the manufacture of the exchangers-reactors and in particular less expensive materials. A significant saving in the costs of manufacturing the exchangers-reactors may be made. Moreover, since the maximum temperature reached in the exchangers-reactors is reduced, the opportunities for designing exchangers-reactors are greater. Specifically, the thicknesses of materials may be smaller for the same mechanical strength. Moreover, the service life of the equipment in operation will be increased owing to operating conditions that are less harsh. Finally, it is possible, with the use of a "colder" flue gas recycle, to comply with lower temperatures at the inlet of the reforming reactors, minimizing the energy consumption and the fuel consumption of the process.

The proposed invention is particularly suitable for exchangers-reactors dedicated to steam reforming. In a favored embodiment of the invention, the exchangers-reactors used have the same design as the one described above and therefore have a "products" stage dedicated to recovery of heat over the synthesis gas and particularly suitable for steam reformers intended to work without export of steam.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein.

DESCRIPTION OF PREFERRED EMBODIMENTS

In these figures, the steam reforming takes place in two reforming reactors (14) and (15).

Two heat sources are used:

the hot synthesis gas (flows 16 and 17) which flow counter current to the feedstock in the steam reforming reactors, a hot fluid, preferentially flue gases (flows 41 and 42) obtained by combustion of a combustible feedstock which is used as main source of heat supply to the steam reforming reaction.

Figure 1:
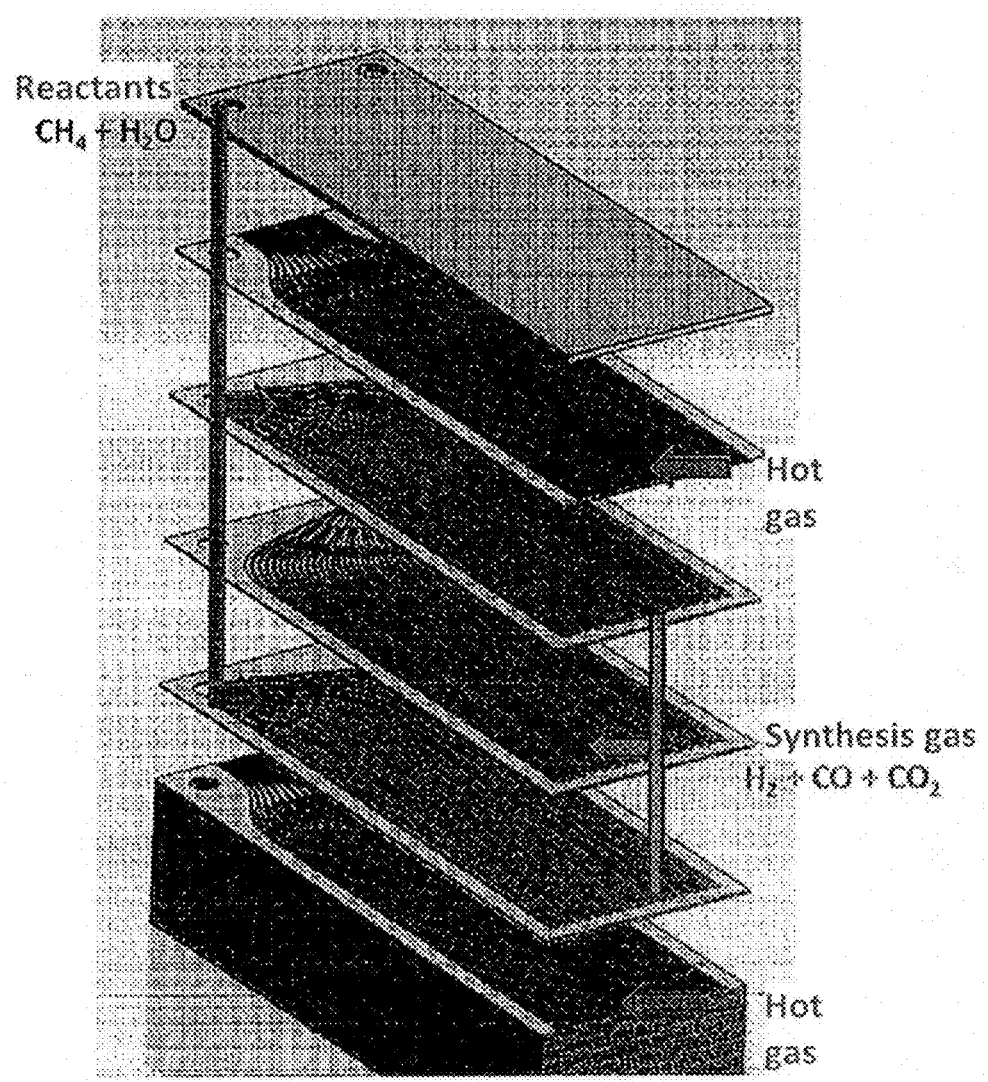
FIG. 1 illustrates the alternating heat supply plates and reaction plates in accordance with one embodiment of the present invention.
Figure 2:
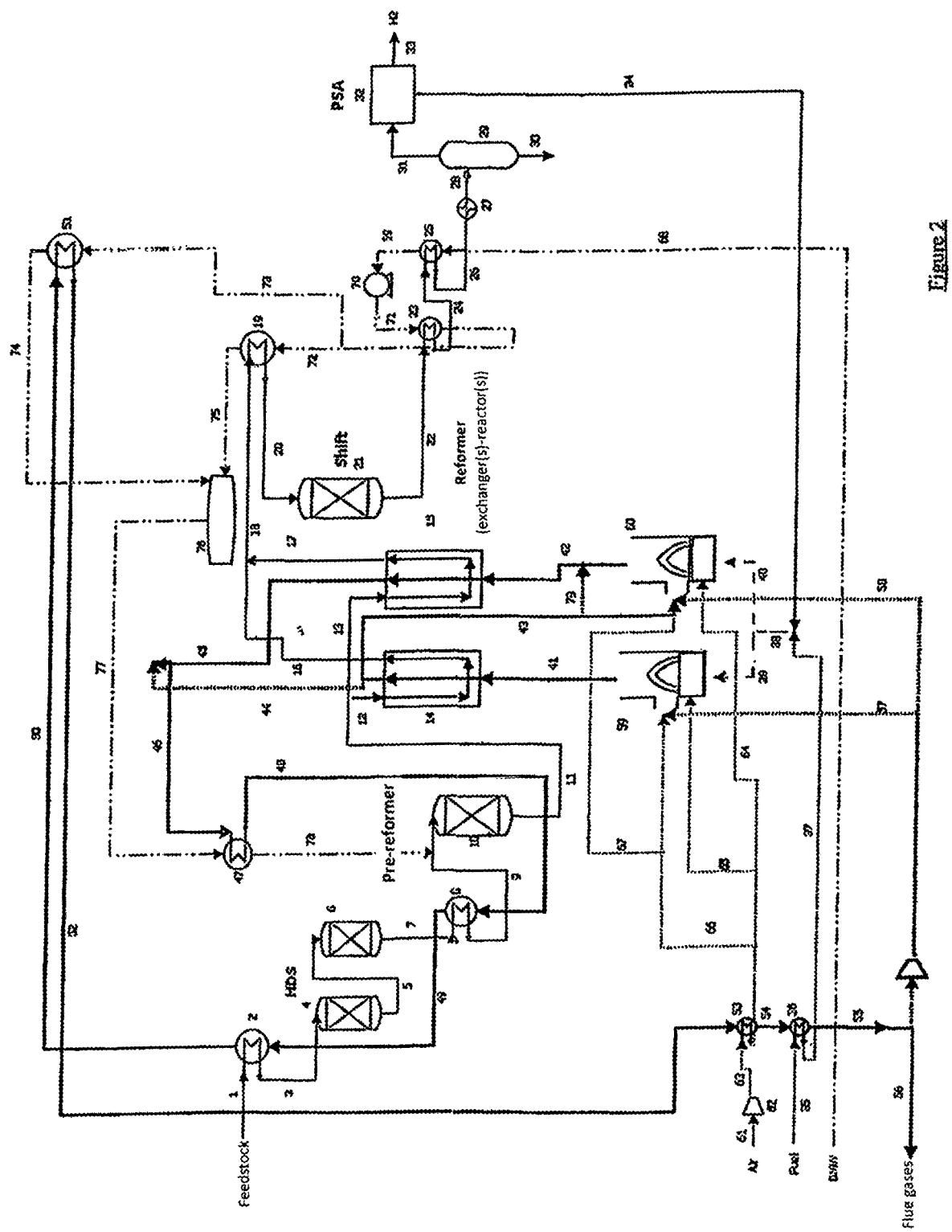
FIG. 2 illustrates a dual burner system, in accordance with one embodiment of the present invention.
Figure 3:
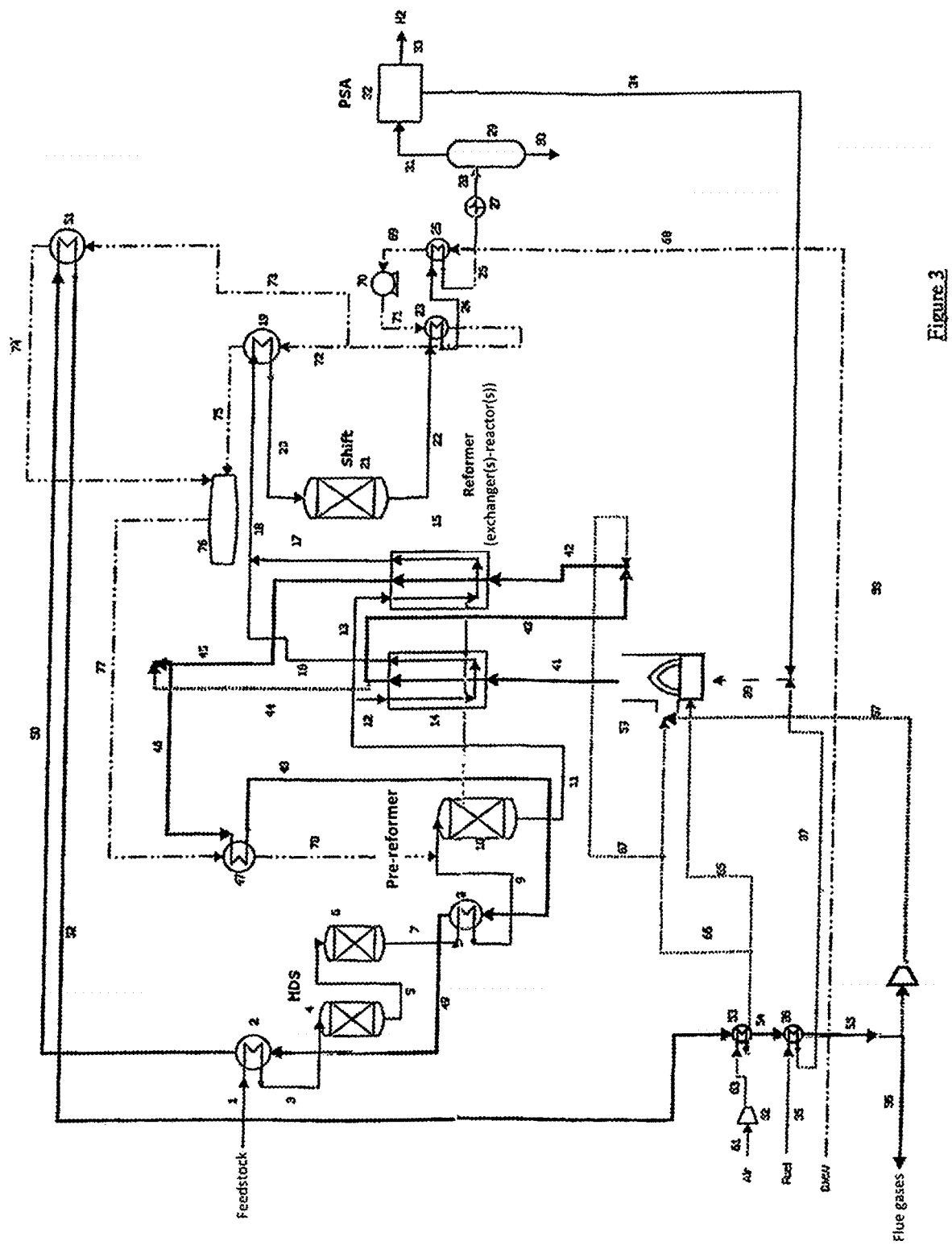
FIG. 3 illustrates a single burner system, in accordance with one embodiment of the present invention.

The steam reforming reactors are supplied relative to one another in parallel with respect to the feedstock (flows 11, 12 and 13) and in series with respect to all or some of the flue gases (flows 41, 43 and (42)). A set of steam reforming reactors may contain one or more steam reforming reactors in parallel. In the case where flue gases are used, these may be generated by one or two dedicated burners (the scheme corresponding to two burners is given in FIG. 2, the scheme with a single burner is given in FIG. 3).

The temperature of the flue gases at the inlet of the steam reforming reactors (14) and (15) is limited by the maximum service temperature of the materials used for the manufacture in keeping with the operating conditions encountered. Similarly, this temperature is imposed for a given material and for operating conditions set by the design of the steam reforming reactor (wall thickness, etc.).

The present invention proposes several solutions in order to comply with the maximum temperature of the flue gases at the inlet of the exchangers-reactors and to supply the heat needed for the steam reforming process. This invention proposes in particular solutions for working with flue gas (flows 41 and 42) temperatures below 1000° C. Thus, it is proposed to introduce into the burners (59) and (60), in addition to the combustion air (64) and (65), flue gases that are "colder" than the combustion flue gases that have been cooled in other parts of the process. The "colder" flue gases recycled to the burner(s) will be able to be introduced therein in various proportions which will offer various operating possibilities disclosed below. The steam reforming reaction takes place in the steam reforming reactors at a temperature between 700° C. and 1000° C. and a pressure between 1 and 60 bar, preferentially between 20 and 40 bar. The synthesis gas leaves the steam reforming reactors at a temperature between 400° C. and 1000° C. The flue gases also leave the steam reforming reactors at temperatures between 450° C. and 750° C.

In order for the temperature of the flue gases obtained at the outlet of the burners to be directly compatible with the use thereof in the steam reforming reactors (temperature below 1000° C.), it is also possible to add dilution air. The excess air may then be greater than 300%. However, very high air consumption results from this solution. This consumption will be able to be reduced by using, as diluent, the flue gases colder than the combustion flue gases that have been cooled in other parts of the process (flows 57 and 58). These flue gases, depending on the type of thermal integration used, are at a temperature between 300° C. and 160° C. They may therefore be introduced in a variable proportion into the burners (59 and 60) with or without dilution air, so that the temperature of the resulting flue gases (flows 41 and 42) is compatible with the steam reforming reactors (14 and 15).

The amounts of dilution air and/or of "colder" flue gases are also adapted to obtain, after mixing of the flue gases (43) from the first steam reforming reactor, a compatible temperature for the flue gases (42) sent to the second steam reforming reactor (15). It results therefrom that the amounts of dilution air and/or of recycled "colder" flue gases used between the two burners may differ. The use, in series, of the flue gases leaving the first steam reforming reactor (43) for diluting the flue gases the flue gases entering the second steam reforming reactor (42) makes it possible to improve to reduce the energy consumption of the process. In one solution with a single burner, it is the amount of flue gases sent to the mixing point with the flue gases leaving the first steam reforming reactor (14) that will be adapted in order to obtain, at the inlet of the second steam reforming reactor (15), the target temperature. Therefore, the amount of flue gases sent to one or other of the two steam reforming reactors (14 and 15) could be different in a configuration with a single burner.

Finally, depending on the oxygen content of the "colder" flue gases or of the flue gases from the first steam reforming reactor, these could replace the combustion air in the burners to the extent that it is possible to reduce the amount of combustion air supplied to the burners. It is also possible via this solution to operate without combustion air at one of the burners. In the case where it is desired to operate without combustion air or with a smaller amount, it will be necessary to ensure that the amount of oxygen supplied to the burners always complies with the constraint of excess air of at least 8% relative to the minimum amount required for the complete combustion of the combustible feedstock.

The flue gases are generated by combustion of the mixture of a combustible feedstock (37) and purge gases (34) from the purification process. Specifically, in order to satisfy the purity requirements regarding the hydrogen and in order to maximize the production of hydrogen, the synthesis gas may undergo additional conversion steps (water-gas shift reaction) and must undergo a final purification step. At the end of this final purification step, two gas flows are obtained, one rich in hydrogen and in accordance with the purity requirements that constitutes the product of the steam reforming process, the other containing the residual gases of the processes and that can be reused judiciously as fuel. The purge gases (34) originating from the PSA may be used in a variable amount for the generation of the flue gases. Preferentially, all the purge gases from the PSA are sent to the combustion. The combustible feedstock (35) may be introduced in a variable proportion for the requirements of the process.

In order to ensure the combustion of the mixture of purge gases from the PSA and of the combustible feedstock, combustion air is also sent to the burners (flows 64 and 65). The amount of combustion air which is sent to the burners is adjusted in order to ensure the complete combustion of the mixture of fuels. This air is preferentially introduced with a slight excess so that the oxygen sent to the burners is in excess by at least 8% relative to the minimum amount needed for the complete combustion of the fuel. As explained above, it is also possible to replace the combustion air with recycled flue gases on condition that these supply a sufficient amount of oxygen to ensure an excess of oxygen of at least 8%. The temperature of the flue gases resulting from this simple combustion is too high to be able to use the flue gases directly in the steam reforming reactors.

This temperature may be close to the adiabatic flame temperature and easily exceeds 1400° C. This is why it is necessary, as explained above, to add dilution air and/or recycled cold flue gases to the burner(s) in order to be able to reduce the temperature of the flue gases sent to the exchangers-reactors.

The two steam reforming reactors are in parallel with respect to the feedstock (flows 12 and 13) and the synthesis gas produced (flows 16 and 17). They are supplied by hot flue gases (flows 41 and 42) generated by one or two dedicated burners (59 and 60). All or some of the flue gases leaving the first steam reforming reactor (14) are sent either to the second burner (60) dedicated to the generation of the flue gases for the second steam reforming reactor (15), or mixed directly with the flue gases (79) obtained at the second burner. The remainder of the flue gases is directly mixed with the flue gases (45) leaving the second steam reforming reactor.

Preferentially, all the flue gases from the first steam reforming reactor are sent to the flue gases of the second steam reforming reactor, either by means of mixing in the second burner (60) or by mixing with the flue gases (42) from the second burner. The temperature of the flue gases leaving the first reactor may vary between 450° C. and 750° C.

If a single burner is used, all or some of the flue gases from the first steam reforming reactor (14) will be sent directly to the flue gases (42) intended for the second steam reforming reactor, the remainder being sent to the flue gases (45) leaving the second steam reforming reactor.

Preferentially, all the flue gases from the first steam reforming reactor will be sent to the flue gases of the second steam reforming reactor and will therefore be mixed with the flow (42).

The remainder of the process corresponds to a conventional steam reforming process.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The invention claimed is:

1. A process for producing synthesis gas using at least a first and a second steam reforming reactor each comprising at least one reaction stage enabling the circulation of a reaction mixture and at least one heat supply stage enabling the circulation of a heat transfer fluid, the process comprising the following steps:
   a) mixing a hydrocarbon feedstock gas and steam thereby forming the reaction mixture,
   b) simultaneously supplying the reaction stages of the first and second steam reforming reactors with the reaction mixture obtained in step a),
   c) producing combustion flue gases within the steam reforming reactors, wherein the combustion flue gases are used as heat transfer fluid,
   d) cooling the combustion flue gases to a temperature below 1000° C.,
   e) introducing the combustion flue gases from step d) into the heat supply stage of the first steam reforming reactor,
   f) recovering the combustion flue gases at the outlet of the first steam reforming reactor and introducing them into the heat supply stage of the second steam reforming reactor, and
   g) recovering synthesis gas at the outlet of the first and second steam reforming reactors.

2. The process of claim 1, wherein in step d) the combustion flue gases are cooled to a temperature below 900° C.

3. The process of claim 1, wherein in step d) the combustion flue gases are cooled by dilution with flue gases that are colder than the combustion flue gases recovered downstream of the at least first steam reforming reactor and/or with dilution air.

4. The process of claim 2, wherein the flue gases that are colder than the combustion flue gases have undergone a cooling by steam generation.

5. The process of claim 2, wherein in step d) the cooling of the combustion flue gases takes place by 0 to 80% dilution with flue gases colder than the combustion flue gases recovered downstream of the at least first steam reforming reactor and 0 to 80% dilution with dilution air.

6. The process of claim 1, wherein in step c) the combustion flue gases are produced by means of at least one burner.

7. The process of claim 5, wherein in step c) the combustion flue gases are produced by means of a first and a second burner, the first burner generating the combustion flue gases for the first steam reforming reactor and the second burner generating the combustion flue gases for the second steam reforming reactor.

8. The process of claim 6, wherein the combustion flue gasses are produced by means of a first burner and a second burner, and wherein the combustion flue gases from steps c), d) and e) correspond to those generated by the first burner and in step f) the combustion flue gases are recovered at the outlet of the first steam reforming reactor before sending them to the second burner generating the combustion flue gases for the second steam reforming reactor.

9. The process of claim 6, wherein the combustion flue gasses are produced by means of a first burner and a second burner, and wherein the combustion flue gases from steps c), d) and e) correspond to those generated by the first burner and in step f) the combustion flue gases are recovered at the outlet of the first steam reforming reactor before mixing them with the combustion flue gases generated by the second burner; said mixture then being introduced into the heat supply stage of the second steam reforming reactor.

10. The process of claim 1, wherein the first and second steam reforming reactors are selected from the group consisting of multitubular reactors, plate and wave reactors and plate and channel reactors.

11. The process of claim 1, wherein the synthesis gas recovered in step g) comprises hydrogen and carbon monoxide and said process uses a hydrogen purification unit.

12. The process of claim 11, wherein the hydrogen purification unit is a PSA pressure swing adsorption unit.

13. The process of claim 12, wherein a residual flow leaving the PSA is recycled for the production of the combustion flue gases.

14. The process of claim 1, wherein the steam reforming reactors are milli-structured reactors.

15. The process of claim 1, wherein the steam reforming reactors have no assembly interfaces between the reaction stages and the heat supply stages.

16. The process of claim 14, wherein the steam reforming reactors are manufactured by an additive manufacturing method.

* * * * *